May 8, 1923.  
H. I. WASHBURN  
1,454,093  
AGRICULTURAL TRACTOR  
Filed Sept. 23, 1919  
6 Sheets—Sheet 5
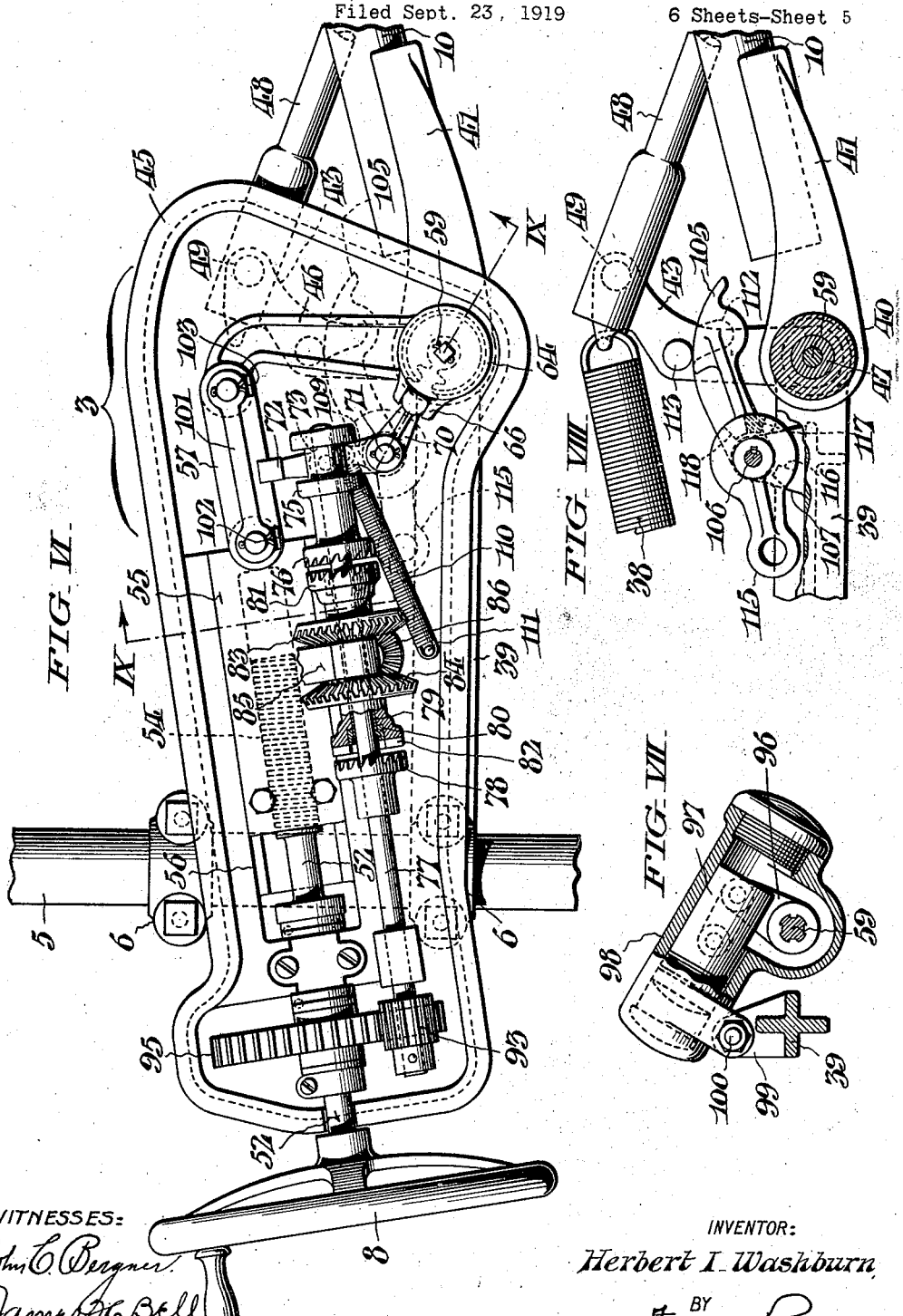
WITNESSES:  
John C. Bergner  
James G. Bell
INVENTOR:  
Herbert I. Washburn  
BY  
Finley + Paul  
ATTORNEYS.

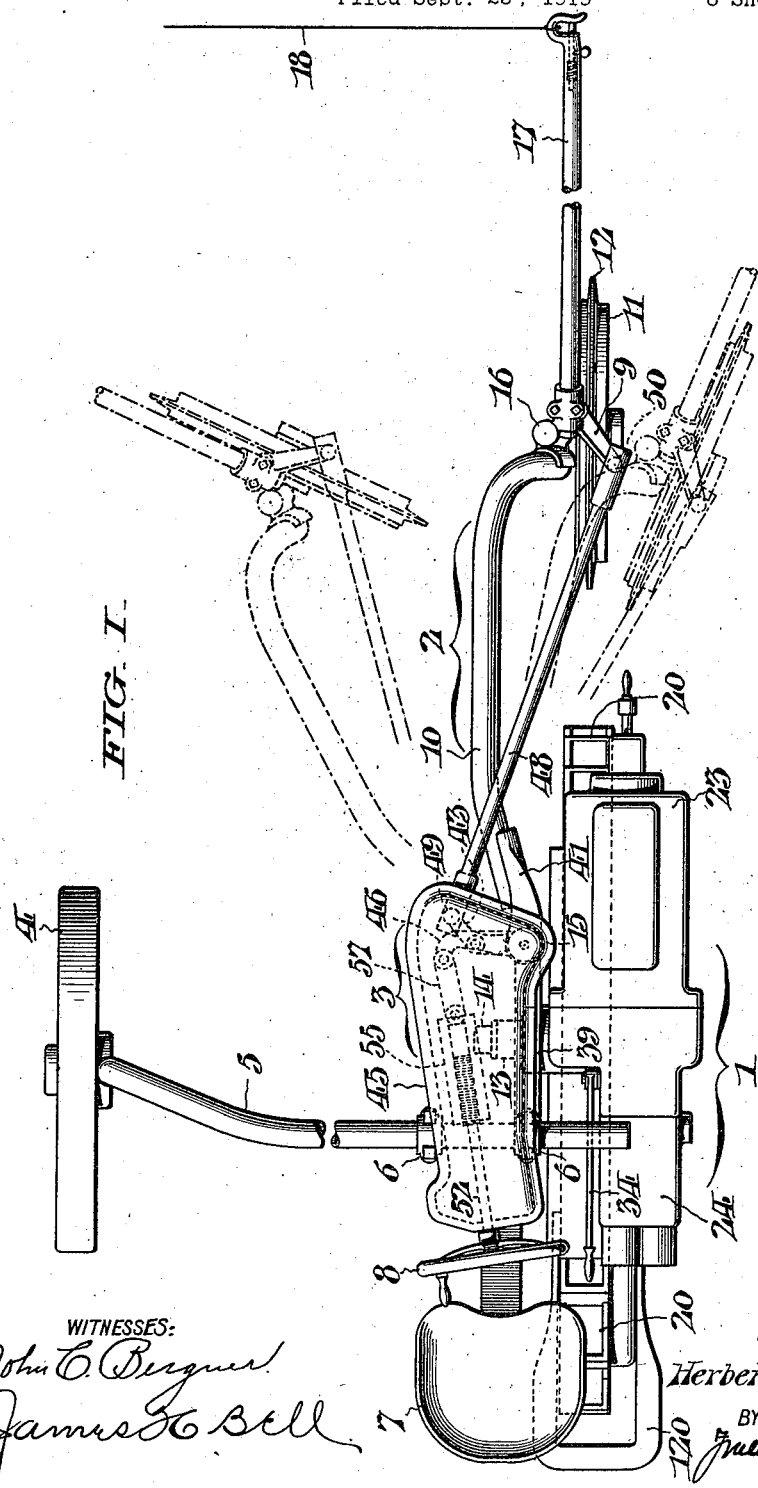

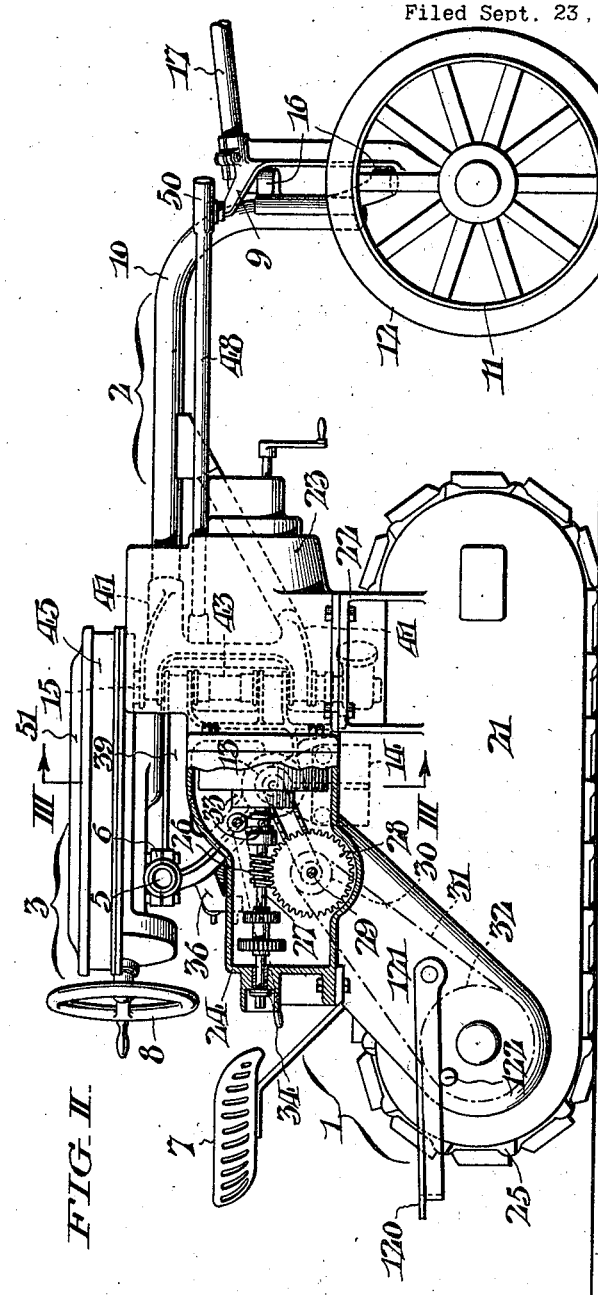

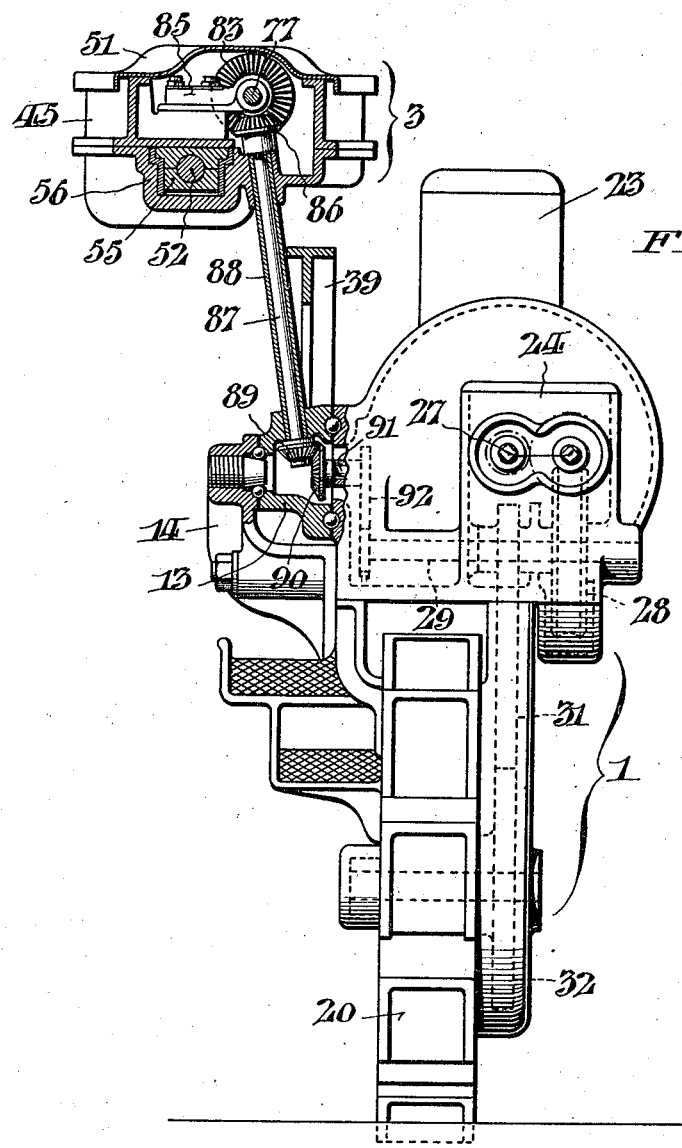

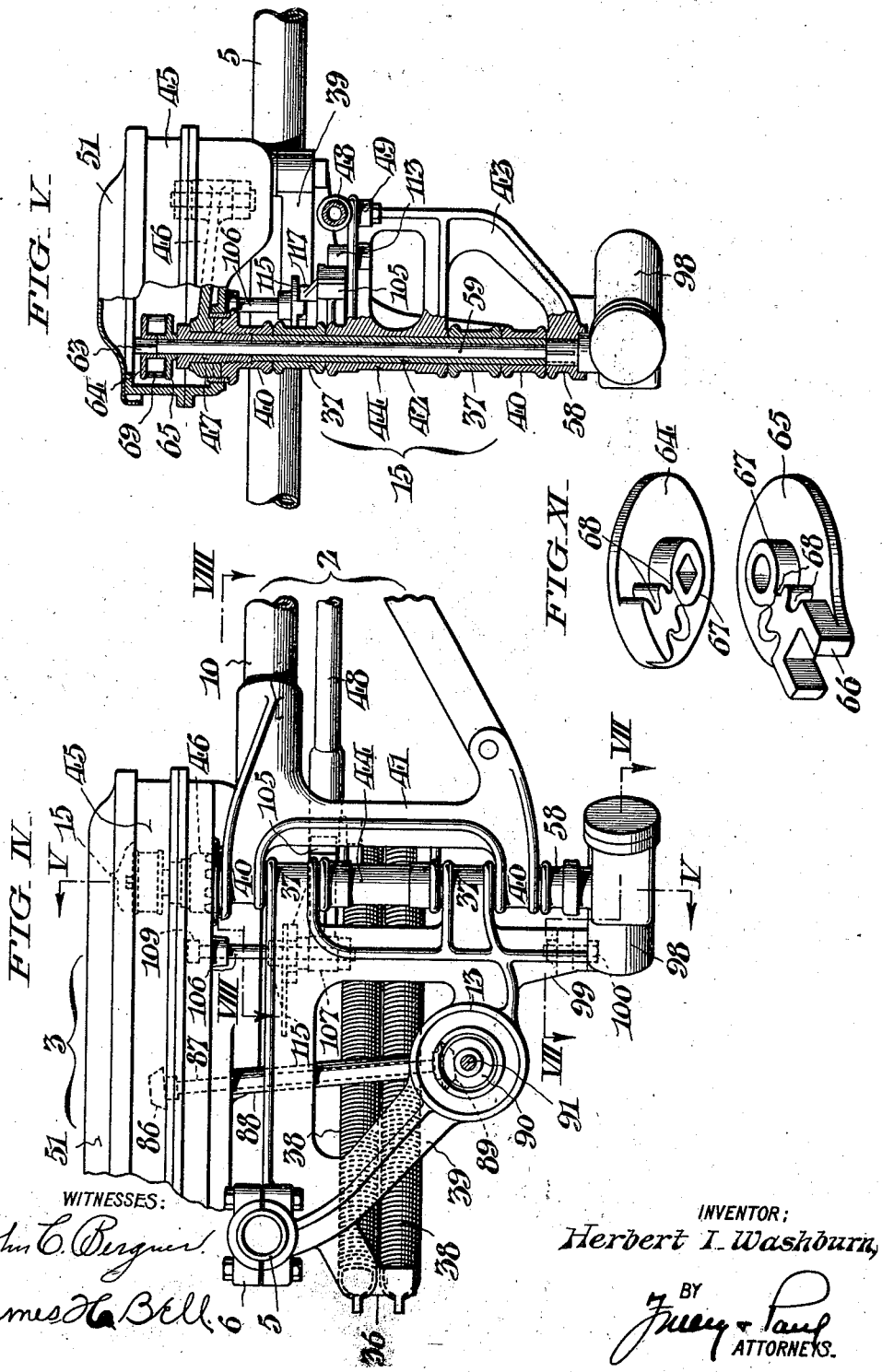

May 8, 1923.
H. I. WASHBURN
AGRICULTURAL TRACTOR
Filed Sept. 23, 1919 6 Sheets-Sheet 6
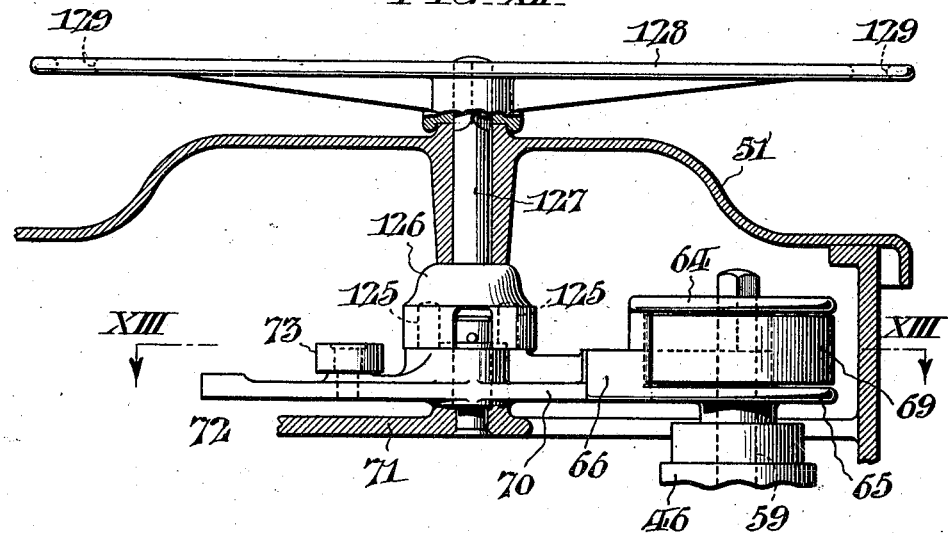
FIG. XII.
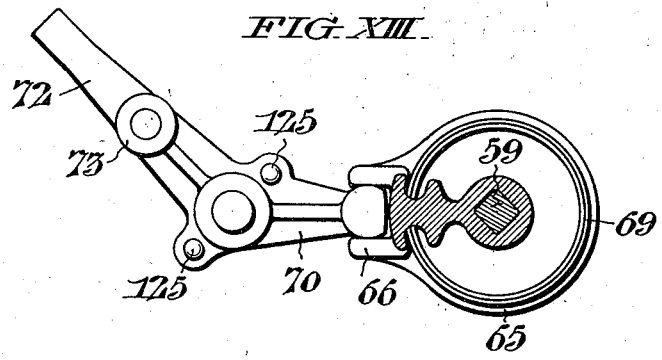
FIG. XIII.
WITNESSES:
John C. Bergner
James H. Bell
INVENTOR:
Herbert I. Washburn,
BY
ATTORNEYS.

Patented May 8, 1923.

1,454,093

UNITED STATES PATENT OFFICE.

HERBERT I. WASHBURN, OF MAGNOLIA, NEW JERSEY.

AGRICULTURAL TRACTOR.

Application filed September 23, 1919. Serial No. 325,796.

*To all whom it may concern:*

Be it known that I, HERBERT I. WASHBURN, of Magnolia, in the county of Camden and State of New Jersey, have invented certain new and useful Improvements in Agricultural Tractors, whereof the following is a specification, reference being had to the accompanying drawings.

My invention relates to agricultural tractors adapted for drawing agricultural implements of any well known or approved type. An apparatus of this sort is shown and described in my Patent #1087620 granted February 17, 1914. The tractor shown in that patent is adapted for automatic operation under the control of a wire or cable connected between it and a center field post and serving to guide it over a spiral course over gradually increasing or decreasing radius or curvature as may be desired. It is also capable of operation under manual control.

The principal object of my present invention is the adaptation of this general type of tractor to crawler chain operation, which affords the advantage of more efficient and more powerful traction. My invention is also concerned with improved steering gear which in connection with the crawler chain type of tractor can be caused to compel it to follow the desired curvilineal path in tangential relation, so that the convolutions of the course traced by the tractor may be comparatively closely spaced, in despite of the extent of contact area of the chain with the ground.

In the drawings, Fig. I is a plan view of a motor crawler tractor conveniently embodying my invention.

Fig. II is a side elevation of the tractor as seen from the bottom of Fig. I, a casing which encloses certain parts being in section to render these parts visible.

Fig. III is a rear elevation of the main crawler portion of the tractor on a larger scale, certain parts being shown in section along line III—III of Fig. II.

Fig. IV is a fragmentary view on an enlarged scale illustrating the pivotal connection between the tractor unit and the guiding or steering unit of the tractor,—these parts being indicated in dotted lines in Fig. II and lying to the rear of certain parts of the crawler unit.

Fig. V is a sectional view at a plane indicated by the line V—V in Fig. IV.

Fig. VI is an enlarged plan view of the steering mechanism appearing in dotted lines in Fig. I, the cover of its enclosed casing being removed.

Fig. VII is an enlarged detailed sectional view taken on the line VII—VII of Fig. IV, looking downward.

Fig. VIII is a fragmentary detailed plan of the parts below line VIII—VIII in Fig. IV, certain parts being in section at said line VIII—VIII.

Fig. IX is a staggered cross sectional view through the steering mechanism, taken as indicated by the dot and dash line IX—IX of Fig. VI.

Fig. X is a detailed plan view of certain parts lying below the line X—X in Fig. IX, some of the parts appearing in section at said line.

Fig. XI is a perspective view of two cooperative parts illustrated in Fig. X conveniently separated.

Fig. XII, is a detail, fragmentary sectional view through a portion of the steering mechanism casing showing a supplemental steering beam whereby the tractor may be manually guided from a remote point, for example from a trailing vehicle or other device; and Fig. XIII is a plan section along the line XIII—XIII of Fig. XII.

Referring first to Figs. I, II and III, it will be seen that the device comprises an endless chain crawler unit 1, of substantial ground-contact base length and of narrow ground-contact base width, and a deflector guide unit 2 associated therewith. The crawler unit 1, comprises as its principal parts a chain and power plant structure appearing at the front of Fig. 1 and at the right of Fig. III and a steering attachment structure 3, appearing at the top of Fig. I and, in part, to the left and top of Fig. III. This structure 3 includes a frame 39, which carries, it will be seen, a stabilizing outrigger in the form of an extension wheel 4, whose extension bar 5, is suitably clamped thereto at 6, and a seat 7, for the operator, as well as a steering wheel 8 and other steering mechanism mounted in convenient proximity to the seat. The deflector guide unit 2, as will be seen from Figs. I and II, comprises a deflector arm element 10, attached to the steering and attachment I and II, comprises a deflector arm element 11, attached to said arm and shown as having the form of a wheel with narrow tread and central projecting flange 12, of sufficient depth to give ample penetration and hold in the soil for resisting the lateral thrust incidental to its function of forcibly deflecting and turning, guiding and steering the crawler and the entire tractor while in motion. The crawler unit having a ground contact base of substantial length, the steering and attachment structure 3, is itself attached to the crawler and power plant structure in such a way as to permit independent relative movement of the deflector arm element 10 vertically with reference to the contact base, to compensate for the inequalities of the ground; as shown in Fig. III, this connection is by means of a horizontal trunnion 13, formed on the frame 39, and pivotally mounted on ball bearings between the main body portion of said crawler and power plant structure and a bracket 14, attached thereto. To enable the deflector guide unit 2, to perform its functions of guiding and steering the tractor, it is attached to the steering structure 3, by means of a vertical pivotal attachment 15, so as to be horizontally shiftable with reference thereto. The deflector element 11 is, in turn, made angularly shiftable with reference to the arm 10 and to the crawler ground contact base, by virtue of vertical pivotal attachment to said arm at 16. The steering of the tractor, is therefore, effected by suitably shifting the arm 10 with reference to the crawler unit and the deflector element 11 with reference to the arm 10, as hereinafter described.

In automatic operation, the deflector element is controlled by means of an extension bar 17, whose outer end is attached to a flexible connector in the form of a wire or cable 18, extending from a field center post in a manner clearly shown and described in the patent herein before referred to.

Still referring to Figs. I, II and III, it will be seen that the crawler unit and power plant structure comprises an endless tractor chain 20, of any approved design whose principal operating parts are enclosed in a casing or housing 21. On a bracket 22 forming part of said housing, are mounted a motor 23, (here diagrammatically represented as an internal combustion engine,) and a transmission casing or housing 24, at the rear of said motor. The transmission from the engine shaft to the driving tractor sprocket wheel 25, comprises a worm 26, on a transmission shaft 27, which is geared to the engine shaft, said worm operating a worm wheel 28 on a counter shaft 29. On the shaft 29 is a sprocket wheel 30, which is connected by a chain 31, with another sprocket 32, on the shaft of wheel 25. A clutch 33, controls the driving connection between the engine and the tractor chain 20, and is operable by a lever 34, extending within convenient reach of the operator's seat 7.

Referring, now, to Figs. I, II, IV and V, it will be seen that the pivotal connection 15 between the frame 39 and the arm 10 comprises a pair of knuckles 37, 37 on said frame 39 and a similar pair of knuckles 40, 40 on a bracket 41, forming part of said arm 10. Through these knuckles extends an axis member, here shown as in the form of a hollow sleeve 42. Co-axial with the sleeve 42, is pivotally mounted an auxiliary movable element 43, by means of an extended knuckle 44, embracing said sleeve. Said auxiliary movable member 43 is subject to the pull of coiled springs 38, 38 extending from a fixed anchorage 36, on frame 39, see Fig. IV. These springs serve to maintain the proper working tension upon the flexible guide connector 18, during automatic steering, as will become apparent from the description of operation of the apparatus which follows later on.

The various parts which have the sleeve 42 as their axis are surmounted by a casing 45, which is attached to the frame 39, and serves to enclose and protect certain operating parts of the steering mechanism proper. As will be seen from Figs. I, IV, V, VI, VIII and IX, there is mounted within this casing, co-axial with said sleeve 42, a crank arm 46, whose lower side is in toothed engagement with the correspondingly toothed upper side of the upper knuckle 40, of the bracket 41, of the deflector arm 10, and is clamped there against by the hollow bolt 47, screwed into said knuckle, so that said arm 46 is, in effect, a part of member 10. The movable auxiliary element 43, on the other hand, is interconnected with the deflector element 11 by means of a link rod 48, pivoted to said auxiliary member at 49, and to an arm 9, of the mounting of the deflector wheel 11, at 50 (see also Fig. II). It will be seen, therefore, that by movement of the crank arm 46, within the casing 45, the deflector arm 10, will be shifted horizontally through the same angle with reference to the crawler. It will also be seen that by movement of the auxiliary member 43 with reference to the casing 45, and the frame 39, the deflector element 11 will be angularly shifted in a horizontal direction with reference to said deflector arm 10, or vice versa.

Referring now to the steering mechanism Figs. IV, V, VI and IX, it will be noted that its protective casing 45, is provided with a top cover 51, which is preferably removably secured, so that access may be readily had to the parts in the interior for purposes of lubrication and adjustment. Mounted for rotation in said casing is a shaft 52, which protrudes at one end beyond the casing to afford attachment for the hand mental gauge plate 101, superimposed upon the link 57, and provided with washer ends which fit over its pivot pins, as clearly shown in Fig. VI. Said gauge plate has upturned projections 102, 103, which lie in the path of the free end of the arm 72, of the bell crank lever. Thus, when the link has shifted to a certain point in either direction, the lug of the gauge which happens to occupy an active position, by its contact with the lever, causes the disconnection of the clutch couple on shaft 77 then in operation, and thereby prevents further transmission of rotation to the screw shaft. This independent movement imparted to the bell crank in opposition to the direction obtaining at the time under the action of the exterior steering elements is permitted by the flexible spring connection between the disks 64 and 65 at the top of the shaft 59, the action of which has already been explained. In this way, jamming of the screw 52, and the possibility of breakage of any of the associated parts is positively prevented.

In the hand operation of the synmotor, the auxiliary element 43, is locked in fixed relation to the frame 39 by a locking dog 105 (Fig. VIII) which is loosely mounted upon a vertical shaft 106 supported at its lower end (Fig. IV) in a bearing lug 107, extending laterally from said frame. The upper end of the shaft protrudes through the base of casing 45, to afford attachment for an arm 109 (Fig. VI). To this arm is secured one end of a coiled spring 110, which extends from a fixed anchorage pin 111, within the casing. Referring again to Fig. VIII, the dog is shown as formed with a notch 112, adapted for co-operation with a pin 113, on the auxiliary element 43. Thus it will be seen, that when the dog engages said pin, element 43 will be locked rigidly to the frame 39, and the springs 38, ordinarily effective thereon, rendered inactive. The dog is shifted by means of a hand lever 115, keyed upon the shaft 106, and formed with integral depending lugs 116, 117 adapted for co-operation with a single upstanding lug 118, on the dog. Thus when the lever 115, is moved counter clockwise, the lug 117, thereon, coacts with the lug 118, on the dog to shift the latter toward the pin 113, on the auxiliary element 43. When the hand lever is turned clockwise, the lug 116 coacts with the lug 118 of the dog in tending to swing the latter clear of the path of the pin. The lost motion in the action of the hand lever, by reason of the space between its lugs 116 and 117, permits the rotation of the shaft 106, to a sufficient extent to bring about a transposition of the spring 110 either to one side or other of what may be termed its dead center line, with relation to the shaft center and fixed anchorage pin. In either event, the torsional effect of the spring upon the shaft will be such as to tend to automatically shift the dog into or out of engagement with the pin 113, on auxiliary frame 43, when the tension of the spring 38, is temporarily manually relieved.

As a means of attachment for agricultural implements of the various sorts ordinarily employed in farming, I have provided a draw frame or bracket 120, which is pivoted at 121, to the sides of the protective casing 21, for the crawler chain. Ordinarily this frame rests upon projecting lugs 122, which thereby limit its downward movement.

When the tractor is employed to draw a trailing vehicle or separate agricultural apparatus, it is often advantageous for the operative to be able to effect steering from the drawn apparatus rather than from the tractor itself. For this purpose, the supplemental steering appurtenance illustrated in Figs. XII and XIII, is provided. In these figures the parts of the tractor already described, are indicated by the same reference characters as before. In the present instance the bell crank lever having the arms 70 and 72, has projecting dowel pins 125, which are engageable by a socket member 126, on the lower end of a shaft 127, extending through the cover 51, of the casing 45. To the upper protruding end of the shaft 127, is attached a steering beam 128. The ends of the beam are formed with eyes 129—129 for the attachment of ropes or reins which may be controlled by the operator from the drawn vehicle. From Fig. XII it is to be noted that the attachment of the supplemental steering elements, is such that the cover 51 of the casing 45, may be readily removed without the necessity of any disassembling.

The manual operation of the device is as follows:

To arrange the synmotor for manual steering under control of the hand wheel 8 the auxiliary elements 43, is locked into fixed relation with the frame 39. This is accomplished by turning the lever 115, to the position illustrated in Fig. VIII, the lug 117 thereon, engaging the lug 118 upon the dog 105 and urging the same toward the pin 113 on element 43. By manually shifting the deflecting wheel 11, the pin 113 is brought into proper registry with the co-operative notch 112 of element 43. As a consequence these parts automatically lock and are thus maintained by action of the spring 110, upon shaft 106, and lever 115 tending to rotate the same in a counter clockwise direction. After the preliminary setting just described, the rotation of the hand wheel 8, in one or the other direction, will cause corresponding shifting of the arm 10, under the actuation of the arm 46, which is coupled to slide block 55. The effect of the movement of the arm 10, upon the angular position of the deflecting wheel 11, with rewheel 8, already referred to. The opposite end of said shaft is threaded as indicated at 54, for engagement with a slide block 55, supported for reciprocation in a guideway 56, in the casing. Said block is connected by means of a link 57, with the end of the crank arm 46. Thus, by rotating the hand wheel 8, either in one direction or the other, the corresponding motion is translated by the screw shaft and the other intervening elements, and transmitted to the deflecting mechanism 2, and steering is accordingly manually accomplished.

Passing again to Fig. V, it will be noted that the element 43, has in addition to its bearing knuckle 44, a lower knuckle 58, which is splined to an enlargement formed upon the lower end of a shaft 59, extending co-axially through the sleeve 42, of the pivotal joint 15, and into the casing 45, of the steering mechanism 3. The upper end of the shaft 59 is squared as shown at 63, for the attachment of a disk 64. Associated with said disk, is a second disk 65, which is loosely mounted upon the shaft 59, and has the same general configuration as the former except for a jaw extension 66, see Fig. XI. Each of the disks comprises a central hub 67, from which extends a radial web of even depth, said web having notches 68, 68, for the reception of the ends of a laminated bow spring 69, as shown in assembly in Fig. X. When the disk 64, is superimposed upon the other, in the relation suggested in Fig. XI, and the couple finally assembled as shown in Figs. V and IX, the spacing is such as to provide a clearance interval for the accommodation of spring 69. It will be further seen that the spring 69, is of such width as to simultaneously engage the notched webs of both disks, so that the latter are held aligned and normally operate as a unit. By this construction, the jaw disk 65, is so mounted upon the shaft as to be capable of yielding to permit excess deflection of the steering elements in a manner to be further hereinafter described.

Referring again to Fig. VI and also to Figs. IX and X it will be noted that engaged within the jaw of disk 65, is one arm 70, of a bell crank lever, having its fulcrum upon a fixed bracket 71. The other arm 72, of said lever carries a roller 73, which operates within the groove of a collar 75, forming part of a clutch member 76, fixed upon a shaft 77. Said shaft is parallel to the screw shaft 52, and also carries a second fixed clutch member 78, disposed in reversed relation with respect to the first, and spaced therefrom a suitable interval for the accommodation of a sleeve 79, which is loosely mounted upon the shaft and provided at its ends with fixed collars 80. Said collars serve as retainers for the double crown clutch members 81 and 82 which are adapted to co-operate respectively with the clutch members 76 and 78, already described. The clutch members 81, and 82, are in turn loosely mounted upon the sleeve 79, and are respectively formed with integral bevel gears, 83 and 84, and maintained in spaced relation by a fixed central bearing 85, which supports the sleeve and at the same time holds the same, together with the parts carried thereon, from end wise movement on the shaft 77. The gears 83 and 84, are simultaneously driven in opposite directions by a constantly rotating intermeshing bevel pinion 86. Said pinion is fixed to the upper end of a vertical shaft 87, which extends down through a boss of the casing 45, and terminates within the hollow of the trunnion bearing 13, of the frame 39, see Fig. III. In the interval between the casing and the bearing the shaft is protected against exposure by a fixed sheathing sleeve 88. To the lower end of the shaft is secured a bevel pinion 89, which receives motion from a similar pinion 90, upon a stub shaft 91 journalled within the transmission casing 24. Shaft 91, is driven by a chain 92, from the counter shaft 29, already described. By these means, therefore, power to actuate the shifting means (including the clutch 76, 78,) of the steering mechanism is transmitted from the power plant of the crawler unit through the trunnion connection 13, without interference with or from relative movement of the parts to compensate for inequalities of the ground.

Referring once more to Fig. VI, it will be seen that the left hand end of the shaft 77, carries a spur pinion 93, which meshes with the gear 95, upon the screw shaft 52. Thus, when the shaft 77, is shifted so that one or the other clutch couples are connected, rotative motion in the corresponding direction is imparted to it. This motion is in turn transmitted through the gears 93, 95, to the screw shaft 52, thereby causing movement of the slide block, either forward or rearward, as the case may be.

As best shown in Figs. IV, and VII, to the lower end of the vertical shaft 59, is fixed an arm 96, which has a linked connection with the piston 97, of an oil filled dash pot 98 secured to a lug 99 on the frame 39 by means of a screw bolt 100. In automatic steering, any spasmodic impulses will be absorbed by said dash pot. This adjunct and its specific purpose will also be better understood from further description.

As a protection against the possibility of breakage of any of the parts of the steering mechanism during automatic operation or rein steered-manual control, I prefer to restrict the motion of the slide block 55, in casing 45, within predetermined limits. This I accomplish by the aid of a supplelation to the crawler is independently but cooperatively augmented by the action of the link 48 upon the projection 9, of the deflector wheel mounting, owing to the crossed arrangement of the rod 48 with reference to the arm 10 and to the fact that the connections of said arm 48 at 49 and 50 are at opposite sides of the center lines of the pivotal axes 15 and 16 on the arm 10. By the compounded action thus obtained, the proper coordination between the crawler and the steering elements is cooperatively established in all angular positions so that the device may accurately trace a curved path of the minimum width of ground contact commensurate with the length of the crawler.

The automatic operation of the device is as follows:

In effecting such operation, the synmotor is connected by means of the guide wire 18, to a center post in the field which is to be cultivated, so that the device is caused to trace a spiral course of either increasing or decreasing radius, depending upon the direction of travel and on whether the wire is accordingly either unwound from, or wound upon the post. Preparatory to setting the synmotor in motion, the operative swings the lever 115 (Fig. VIII,) in a clockwise direction, so that the lug 116 of the latter engages the co-operative lug 118, on dog 105, and withdraws the same from engagement with the pin 113, on element 43 when friction between 112 and 113 is relieved by operator's pressure upon arm 17 in the temporarily holding 17 while pitching it to wire 18. At the same time, the rotation of shaft 106 causes the spring 110, to be transposed to the opposite side of the neutral axis with relation to the shaft center from the position illustrated. The torsional effect exerted by the spring upon the shaft is therefore in a counter direction tending to maintain the dog in inactive or retracted position. Considering the various parts thus set, the guide wire 18 properly connected to the steering pole and the motor started. The apparatus is now given over to the automatic control. As soon as traction begins, the natural tendency of the device to follow a substantially straight line is thwarted by the pull induced upon the guide wire. As a result, the deflecting wheel 11, will be bodily turned upon the pivotal axis 16 of its mounting into tangential relation with the curvature of the predetermined course of travel. At this point it becomes necessary to effect a complimentary relative angular adjustment of the crawler. This is accomplished through the action of the arm 9, of the deflecting wheel mounting upon the connecting rod 48, which swings the element 43, and the latter by reason of its splined connection with the shaft 59, causes rotation of the same. This motion of the shaft is transmitted through the disk members 64, 65 at the top of the same, to the bell crank 70, 72, and the motion of the latter in turn shifts the clutch shaft 77. Said shaft is thus moved to the left (Fig. VI,) so that the clutch member 76 thereon, engages the co-operative clutch member 81, to receive rotation. Such rotation of the shaft is immediately transmitted through the pinion 93, and gear 95, to the screw shaft 52, the latter drawing upon the slide block 55 and through the interposed link 57 and crank arm 46, swinging the deflector arm 10 inwardly (Fig. I,) and thereby effecting proper relative angular adjustment of the deflecting wheel and the crawler. In the course of the readjustment of these parts, the reactive effect of the longitudinal motion induced in the rod 48, causes a counter rotative movement of the shaft 59, thereby restoring the disk couple 64, 65 bell crank, 70—72, and clutch shaft 77, to the normal or neutral positions illustrated in Fig. VI. Thus at each appreciable change in the curvature of the spiral course, the hinged parts of the deflecting mechanism are cooperatively and coordinately shifted in correspondence to maintain an absolute compensative tangential relation of the steering wheel and the crawler. The engagement of either the guide wheel 11, or the stabilizing wheel 4, with abnormal obstructions in the path of travel would tend ordinarily to set the flexible connector wire 18, into violent vibration, but such spasmodic impulses are immediately absorbed by the dash pot 98 with result that the connector is protected against rupture. Excessive movement of the deflector arm 10 is also absorbed by the interposed yielding connection between the bell crank lever 70—72 and the shaft 59 afforded by the disk couple 64—65, so that the clutch members of the steering mechanism are protected against injury by overstrain which would otherwise result. Furthermore, by the provision of the limiting gauge 101, the extent of motion of the feed screw shaft 52, is so controlled as to absolutely prevent jamming and resultant breakage.

In either manual or automatic steering, therefore, one of the elements 10 or 11, alternatively, is initially shifted, and the other is thereby cooperatively shifted in automatic coordination. In manual steering, the arm 10 is first shifted (the auxiliary element 43 being fixed in the manner above described), and the deflector 11 is thereby directly shifted, both by the angular swing of the arm itself, and by means of the parts 9 and 48, etc. In automatic steering, the deflector 9 is first shifted, by means of the arm 17 and the connector or guide wire 18, and the relay comprising the clutches 76 and 78 is thereby brought into action (by the movement of the auxiliary element 43 through its interconnection with the deflector element) to shift the arm. The movement of the auxiliary element 43 in one direction or the other controls the shifting of the clutch shaft 77 and brings about a corresponding selective engagement of the appropriate cooperating clutch elements.

Having thus described my invention, I claim:

1. In a syn-motor, the combination of a crawler unit of substantial ground-contact base length, and a deflector guide unit comprising a deflector arm element movable with reference to the contact base to compensate for inequalities of the ground and a deflector device angularly shiftable with reference to the ground contact base to forcibly deflect and steer the crawler while in motion.

2. In a syn-motor, the combination of a crawler unit of substantial ground-contact base length, and a deflector guide unit comprising an arm having a deflector thereon and angularly shiftable with reference to the crawler unit and independently movable to compensate for inequalities of the ground, and a manually operable power multiplying means to shift the arm to forcibly deflect and steer the crawler while in motion.

3. In a syn-motor, the combination of a crawler unit of substantial ground-contact base length; an attachment structure having a trunnion connection with said crawler unit so as to be independently movable to compensate for inequalities of the ground; and a deflector guide unit angularly shiftable with reference to said attachment structure and carried thereby to forcibly deflect and steer the crawler while in motion.

4. In a syn-motor, the combination of a crawler unit of substantial ground-contact base length; a deflector arm element and an attachment structure so connected together as to permit horizontal shifting of the arm element with reference to the crawler unit, said attachment structure being so connected to said crawler unit as to permit relative vertical movement of the parts to compensate for inequalities of the ground; and steering mechanism on said attachment structure comprising means for horizontally shifting said arm element as aforesaid to forcibly deflect and steer the crawler while in motion.

5. In a syn-motor, the combination of a crawler unit; a deflector guide unit comprising a deflector arm element horizontally shiftable with reference to said crawler unit and a deflector element angularly shiftable with reference to said arm; and means for initially shifting one of said elements and thereby directly and co-operatively shifting the other in manual steering, and initially shifting said latter element in automatic steering and thereby bringing a relay into action to co-operatively shift the former.

6. In a syn-motor, the combination of a crawler unit; a deflector guide unit comprising a deflector arm element horizontally shiftable with reference to said crawler unit and a deflector element angularly shiftable with reference to said arm; and means for initially shifting the deflector element and thereby automatically and co-operatively shifting the arm element in automatic steering, and vice-versa in manual steering.

7. In a syn-motor, the combination of a crawler unit; a deflector guide unit comprising a deflector arm element horizontally shiftable with reference to said crawler unit and a deflector element angularly shiftable with reference to said arm; an auxiliary movable element associated with said crawler unit and interconnected with said deflector element; means for initially shifting said deflector element and thereby bringing into action a relay to co-operatively shift said arm element through resultant movement of said auxiliary element in automatic steering; and means for fixing said auxiliary element and initially shifting said arm element to cause co-operative shifting of said deflector element in manual steering.

8. In a syn-motor, the combination of a crawler unit; a deflector guide unit comprising a deflector arm element horizontally shiftable with reference to said crawler unit and a deflector element angularly shiftable with reference to said arm; means for initially shifting said deflector element and thereby bringing into action a relay to cooperatively shift said arm element; and means for automatically disconnecting said relay to prevent overaction thereof.

9. In a syn-motor, the combination of a crawler unit; an attachment structure movable with reference to said crawler unit to compensate for inequalities of the ground; a deflector arm element horizontally shiftable about a pivotal connection with said attachment structure; a deflector element angularly shiftable about a pivotal connection with said deflector arm element; an auxiliary element freely movable about the pivotal connection between the attachment structure and the deflector arm element; a crank for said deflector element; a rod connecting said crank with the auxiliary element; means for initially shifting said deflector element; and a relay brought into action by the resulting motion of the auxiliary element to cooperatively shift said deflector arm element.

10. In a syn-motor, the combination of a crawler unit; an attachment structure movable with reference to said crawler unit to compensate for inequalities of the ground; a deflector arm element horizontally shiftable about a pivotal connection with said attachment structure; a deflector element angularly shiftable about a pivotal connection with said deflector arm element; an auxiliary element freely movable about the pivotal connection between the attachment structure and the deflector arm element, a crank for said deflector element, and a rod connecting said crank and said auxiliary element at opposite sides of the line of their pivotal axes; means for initially shifting said deflector element; and a relay brought into action by the motion transmitted through said rod to cooperatively shift the deflector element.

11. In a syn-motor, the combination of a crawler unit; a deflector guide unit horizontally shiftable about a pivotal connection with said crawler unit; and a steering mechanism including a crank arm for swinging said deflector guide about its pivotal axis, a slide block operatively connected to said crank, a screw shaft engaging said slide block; and a hand wheel for rotating said shaft.

12. In a syn-motor, the combination of a crawler unit; a deflector arm element horizontally shiftable about a pivotal connection with said crawler unit; a deflector element angularly shiftable about a pivotal connection with said deflector arm element; an auxiliary movable element, mounted for independent movement about the pivotal axis of the deflector arm element, and interconnected with said deflector element; means for initially shifting said deflector element; and relay mechanism thereby brought into action to co-operatively shift said arm element through movement of said auxiliary element, said relay mechanism comprising a crank arm for shifting said deflector arm element, a slide block connected to said crank arm, a screw shaft engaging said slide block, and a clutch mechanism controlled by said auxiliary movable element.

13. In a syn-motor, the combination of a crawler unit; a deflector arm element horizontally shiftable about a pivotal connection with said crawler unit; a deflector element angularly shiftable about a pivotal connection with said deflector arm element; an auxiliary movable element, mounted for independent movement about the pivotal axis of the deflector arm element, and interconnected with said deflector element; means for initially shifting said deflector element; and relay mechanism thereby brought into action to co-operatively shift said arm element through movement of said auxiliary element, said relay mechanism comprising a crank arm for shifting said deflector arm element, a slide block connected to said crank arm, a screw shaft engaging said slide block, a shiftable clutch shaft having a gear connection with said screw shaft and provided with spaced oppositely disposed clutch collars, a continuously rotating double crowned clutch member freely mounted upon said shaft between said clutch collars, and means whereby the induced movement of the auxiliary element in one direction or the other controls the shifting of the clutch shaft and brings about a corresponding selective engagement of the clutch elements.

14. In a syn-motor, the combination of a crawler unit; a deflector arm element horizontally shiftable about a pivotal connection with said crawler unit; a deflector element angularly shiftable about a pivotal connection with said deflector arm element; an auxiliary moveable element mounted for independent movement about the pivotal axis of the deflector arm element, and interconnected with said deflector element; means for initially shifting said deflector element; and relay mechanism thereby brought into action to co-operatively shift said arm element through movement of said auxiliary element, said relay including a selective clutch mechanism controlled by the auxiliary element, and an interposed safety connecting member for absorbing excessive motion of said auxiliary movable element.

15. In a syn-motor, the combination of a crawler unit; a deflector arm element horizontally shiftable about a pivotal connection with said crawler unit; a deflector element angularly shiftable about a pivotal connection with said deflector arm element; an auxiliary movable element, mounted for independent movement about the pivotal axis of the deflector arm element, and interconnected with said deflector element; means for initially shifting said deflector element; and relay mechanism thereby brought into action to co-operatively shift said arm element through movement of said auxiliary element, said relay mechanism comprising a crank arm for shifting said deflector arm element, a slide block connected to said crank arm, a screw shaft engaging said slide block, a clutch mechanism operatively connected with said screw shaft, a safety connecting means interposed between the auxiliary element and the clutch mechanism, and means controlled by the movement of the screw shaft for automatically disconnecting the clutch in the event of excessive motion of the auxiliary member to protect the relay mechanism from injury.

16. In a syn-motor, the combination of a crawler unit; an attachment structure movable with reference to said crawler unit; a deflector arm element horizontally shiftable about a pivotal connection with said attachment structure; a deflector element angularly shiftable about a pivotal connection with said deflector arm element; an independently movable auxiliary element secured to a shaft running axially through the pivotal connection between the attachment structure and deflector arm element; means for initially shifting said deflector element; and relay mechanism thereby brought into action to co-operatively shift said deflector arm element through movement of said auxiliary element, said relay mechanism comprising a screw shaft, means for translating the motion of the screw shaft to shift the deflector arm element, a clutch for controlling the rotation of the screw shaft; means for shifting said clutch, and a safety device connecting the clutch shifting means with the shaft of the auxiliary movable element, and comprising a pair of substantially similar disk members, one fixed to said shaft and the other movable with respect thereto, and yielding means for normally maintaining said disk members in registry to function as a unit capable of permitting independent motion of the disks to automatically absorb excessive motion of the auxiliary movable element, beyond that necessary to operate the clutch.

17. In a syn-motor, the combination of a crawler unit of substantial ground-contact base length; a deflector guide unit comprising a deflector element angularly shiftable with reference to said unit; means for initially shifting said deflector element as aforesaid to forcibly deflect and steer the crawler, including an arm for connection to a lateral guide line; means for thereby automatically and cooperatively shifting said arm; and means for actuating said latter means directly from behind the syn-motor for hand steering.

18. In a syn-motor, the combination of a crawler unit including a narrow single endless tread element, an outrigger, an arm carried by the unit for sidewise movement and having its free terminal extended in advance of the unit to a distance sufficient to function in the manner stated, a rolling element carried upon said free terminal for contact with the ground, and a power multiplying means for shifting the arm to forcibly deflect the unit out of its path to a new path of travel.

19. In a syn-motor, the combination of a crawler unit including a relatively narrow single endless tread element, an outrigger, an arm carried by the unit for sidewise movement and having its free terminal directed in advance of the unit to a distance sufficient to function in the manner stated, a rolling element pivotally carried by the free terminal of the arm, a power multiplying means acting upon the arm to shift the same to forcibly deflect the unit out of its path to a new path of travel and means for directing the rolling element to guide the unit along its altered path of travel.

In testimony whereof, I have hereunto signed my name at Philadelphia, Pennsylvania, this 22nd day of September, 1919.

HERBERT I. WASHBURN.

Witnesses:
JAMES H. BELL,
E. L. FULLERTON.